Figure 1:
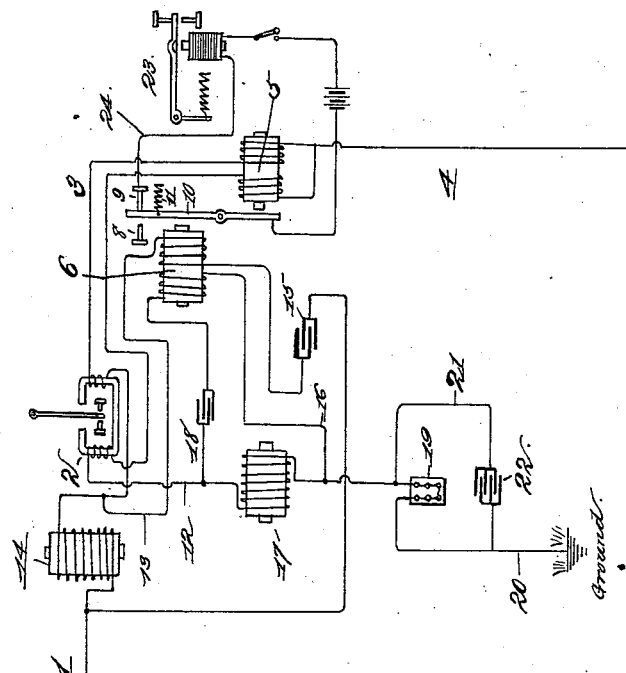

(No Model.) 2 Sheets—Sheet 1.

D. B. GRANDY.
MULTIPLEX TELEGRAPHY.

No. 540,974. Patented June 11, 1895.

Attest
M. P. Smith
John L. Tunison

Inventor:—
Daniel B. Grandy
by Higdon & Higdon Longan
Att'ys.

(No Model.) 2 Sheets—Sheet 2.
D. B. GRANDY.
MULTIPLEX TELEGRAPHY.
No. 540,974. Patented June 11, 1895.
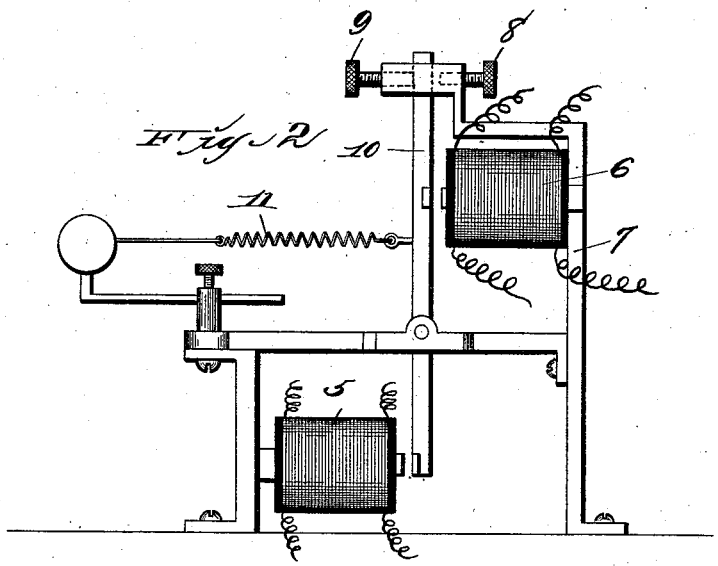
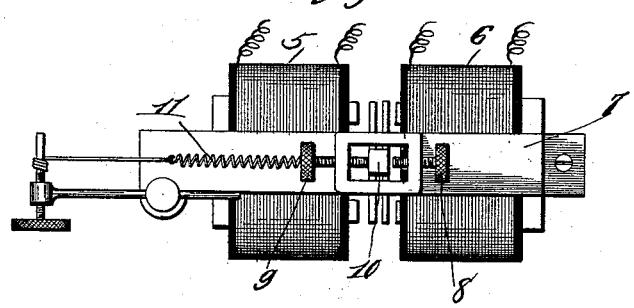
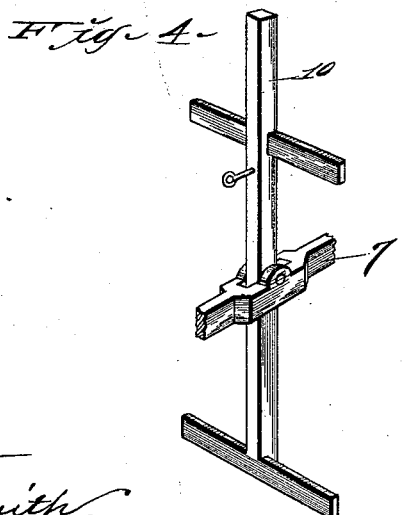
Attest
W. P. Smith
John L. Tunison
Inventor:
Daniel B. Grandy
by Higdon & Higdon & Longan
Attys

UNITED STATES PATENT OFFICE.

DANIEL B. GRANDY, OF ST. LOUIS, MISSOURI.

MULTIPLEX TELEGRAPHY.

SPECIFICATION forming part of Letters Patent No. 540,974, dated June 11, 1895.

Application filed December 17, 1894. Serial No. 532,016. (No model.)

*To all whom it may concern:*

Be it known that I, DANIEL B. GRANDY, of the city of St. Louis, State of Missouri, have invented certain new and useful Improvements in Systems of Multiplex Telegraphy, of which the following is a full, clear, and exact description, reference being had to the accompanying drawings, forming a part hereof.

My invention relates to multiplex telegraphy.

The object of my invention is the improvement of the working of the neutral relay which is used in the "common" or "neutral" side of the quadruplex system, to respond to signals made by increasing the strength of current from the distant end of the line as distinguished from the "polar" side, in which the polar relay is used to respond to signals made by reversing the polarity of current at the distant end.

No change whatever is made by me in the common essential details of the quadruplex telegraph apparatus as now used, my invention relating to improved means and appliances to be added thereto in order to prevent the armature of the neutral relay at the receiving end from falling away from its front contact during reversals of current at the sending station. For this purpose I use the apparatus and arrangement of circuits shown and described.

In the drawings, Figure 1 is a diagrammatic view. Fig. 2 is a side elevation of the improved neutral relay. Fig. 3 is a plan view of the same. Fig. 4 is a detail view, in perspective, of the armature thereof, detached.

As the usual transmitting instruments, dynamos or batteries and their local connections perform the usual function and form no part of my invention, I have deemed it unnecessary to illustrate the same.

A and B, respectively, indicate two stations connected by a single line 1.

2, 2 indicate any common form of polar relays located at each station, and 3, 3 my improved neutral relays.

4, 4 indicate the conductors which connect my improved apparatus with the dynamos or other sources of electricity and the transmitting instruments at each station.

5 indicates the usual coils or spools of the neutral relay, which are differentially wound in the well known manner and for the usual purpose. To each of the neutral relays I have added additional coils or electro-magnets 6 and supported the same in a suitable frame 7 having the usual adjustable stops 8 and 9. The additional magnets 6 are also differentially wound and the magnets 5 and 6 of each neutral relay are placed in different planes and on opposite sides of a single armature 10 so as to attract said armature in the same direction and toward the same contact-stop 8. The usual retractile spring 11 is applied to said armature.

At each of the stations A and B the coil or magnet 5 is connected to the main line 1 and polar relay 2 and the usual artificial circuit 12, so that outgoing currents pass through the coils of said magnets in opposite directions and neutralize said magnet. One of the coils of the additional magnet 6 is connected to the main line 1 in a shunt circuit 13 around a suitable resistance coil 14, and a common condenser 15 is located in said shunt circuit.

It is evident that the two magnets 5 and 6 of my neutral relay 3 may be combined in a single common sectional magnet having four coils, two opposing coils for outgoing currents to the main and artificial lines, and two opposing coils for outgoing currents to the shunt circuits. Two separate magnets as shown are, however, preferable.

The opposing coil of the magnet 6 is connected to the artificial circuit 12 in a shunt circuit 16 around a resistance coil 17, and another condenser 18 is located in the shunt circuit 16. Said resistance coils 14 and 17 may or may not have iron cores.

A common adjustable resistance or rheostat 19 is located in the artificial circuit 12 and connected to the ground by a conductor 20 in the usual manner. 21 indicates a shunt around said rheostat, in which is located another condenser 22.

The condensers 15 made use of are preferably of the adjustable form, similar to those ordinarily used in quadruplex apparatus, although this construction does not appear to be necessary to a successful operation of my invention, as in practice I have found that if the condensers 15 are of sufficient capacity, and if the capacities are approximately equal, no re-adjustment of their capacity is necessary under ordinary conditions.

The operation is as follows: Outgoing currents on 4 will pass through the coils of the magnets 5 and 6 in opposite directions and produce practically no effect upon the armature 10, and, consequently, the common receivers as 23, located in local circuits as 24, will not be actuated; but currents arriving from the distant end of the line 1 will actuate the polar relay 2 and the neutral relay 3 at the receiving end of the line with the usual result, and the condenser 15 only will be affected, and at the moment of reversal of polarity of the current at the distant end of the main line, the condenser 15 discharges through the appropriate coil of the magnet 6, thereby producing a momentary effect on said magnet which is sufficient when properly regulated and adjusted to hold the armature 10 securely to the contact-stop 8 during the interval of time when the main line magnet 5 of the neutral relay loses its magnetism, and the false signal which would otherwise result is, therefore, by my invention, wholly prevented or done away with on wires of reasonable length.

The outgoing currents pass through the resistance coil 6 to the main and artificial lines in opposite directions and do not magnetize the iron core of said coil, and therefore encounter but little impedance from self-induction in said coil, while the incoming currents pass through but one side of said coil and magnetize the said core, and therefore encounter considerable impedance from self-induction, and this in connection with the electro-magnet 14, causes a stronger charge to enter the condensers by reason of the greater impedance offered by said additional resistance caused by self-induction in the latter.

When my invention is used on very long wires, I have found that the action of the magnet 6 is prolonged and better results are secured when one or more of the resistance coils, as 14 and 17, are wound differentially on soft iron cores and the main and artificial circuits passed through said coils in opposite directions, because the increased self-induction of such coils appears to cause a heavier charge to enter the condenser 15. In practice I have also found that by shunting the condenser circuits around the neutral and polar relays, I may obtain excellent results without the use of any other resistance. This latter method is preferable, as increasing the resistance through which the outgoing current has to pass, weakens its effect on the receiving instrument at the distant station.

The function of the condenser 22 in the shunt 21 around the rheostat 19 is well known, and need not be described by me.

I have used with beneficial results a resistance coil in each of the condenser circuits so arranged that the charge and discharge of one or more condensers on either the main line or artificial line side may be retarded when desired, and the general effect of such charge and discharge on its magnet 6 may be prolonged; but as these appliances are well known and generally used, I do not specifically describe them.

What I claim is—

1. In a quadruplex or multiplex telegraph-system, the combination with the main line, circuits, the means for producing signals simultaneously in each direction by changing the polarity of the line-currents, and the means for producing other and independent signals simultaneously in each direction by varying the strength of said line currents, of an additional resistance in the form of coils differentially-wound on iron cores, condensers shunted around said resistance, and electro-magnets connected in said shunt circuits with said condensers around said resistance, so that said resistance offers but little impedance to outgoing currents beyond its ohmic resistance, while incoming currents encounter a high impedance from the self-induction therein, and a stronger charge is thereby caused to enter the condenser in one of said shunt circuits, substantially as shown and described.

2. In a quadruplex or multiplex telegraph-system, the combination with the circuits, the means for producing signals simultaneously in each direction by changing the polarity of the line-currents, and the means for producing other and independent signals simultaneously in each direction by varying the strength of said line-currents, of resistance in the main and artificial lines (which resistance may be that of the instruments necessary for signaling, or separate resistance), shunt-circuits around said resistance, condensers, one in each of said shunt circuits, and an additional electro-magnet differentially-wound and having one of its coils connected in each of said shunt circuits with the said condensers, so that outgoing currents in charging said condensers pass through the coils of said electro-magnet in opposite directions, and have no effect on said magnet, while incoming currents charge the condenser on the line side only and effect the coil in circuit with that condenser, substantially as shown and described.

3. The combination, in a quadruplex or multiplex telegraph system, of a line, a neutral-relay having a single armature, two separate electro-magnets differentially wound and placed in different planes to attract said single armature in the same direction and toward the same contact-stop, a resistance, and condensers, one of said electro-magnets being connected into the main line and artificial circuits so that outgoing currents pass through its coils in opposite directions, the coils of the other magnet being connected in shunt circuits with said condensers around said resistance in such a manner that outgoing currents in charging said condensers pass through the coils of said resistance in opposite directions and are of no effect, substantially as specified.

4. The combination, in a quadruplex or multiplex telegraph system, of a line, a single armature, a neutral-relay having two mechanically separated electro-magnets differentially wound and placed in different planes to attract said single armature in the same direction and toward the same contact-stop, resistance-coils having iron cores, and condensers, one of said electro-magnets being connected to the main line and artificial circuits so that outgoing currents pass through its coils in opposite directions, the coils of the other magnet being connected in shunt circuits with said condensers around said resistance coils, substantially as specified.

5. The combination, in multiplex telegraphy, of a main line, a neutral-relay having two mechanically separated electro-magnets differentially wound and both magnets placed to attract a single armature in the same direction and toward the same contact-stop, main and artificial line-circuits in which the coils of one of said magnets are placed, a local circuit in which one of the coils of the other one of said magnets is placed, a condenser in said last mentioned circuit, a resistance coil in said circuit, a second local circuit in which the opposing coil of said last mentioned magnet is placed, a separate condenser in said last mentioned circuit, and a resistance coil in said last mentioned circuit, substantially as herein specified.

In testimony whereof I affix my signature in presence of two witnesses.

DANIEL B. GRANDY.

Witnesses:
JNO. C. HIGDON,
MAUD GRIFFIN.